United States Patent

Pientka et al.

[11] Patent Number: 5,844,389
[45] Date of Patent: Dec. 1, 1998

[54] DEVICE FOR OPERATING A WINDSHIELD WIPER

[75] Inventors: Rainer Pientka, Achern; Henry Blitzke, Buehl; Joerg Buerkle, Offenburg, all of Germany

[73] Assignee: Robert Bosch GmbH, Stuttgart, Germany

[21] Appl. No.: 849,666

[22] PCT Filed: Apr. 17, 1996

[86] PCT No.: PCT/DE96/00673

§ 371 Date: Jun. 11, 1997

§ 102(e) Date: Jun. 11, 1997

[87] PCT Pub. No.: WO96/37390

PCT Pub. Date: Nov. 28, 1996

[30] Foreign Application Priority Data

May 27, 1995 [DE] Germany .................. 195 19 501.9

[51] Int. Cl.⁶ ............................................ B60S 1/08
[52] U.S. Cl. .................. 318/444; 318/483; 318/DIG. 2
[58] Field of Search .................................. 318/443, 444, 318/480, 483, DIG. 2; 15/250.01, 250.16, 250.17

[56] References Cited

U.S. PATENT DOCUMENTS 4,495,452  1/1985  Boegh-Peterson ............... 318/444
4,916,374  4/1990  Schierbeek et al. ............. 318/483
5,568,027  10/1996  Teder ............................... 318/483

FOREIGN PATENT DOCUMENTS 3314770  10/1984  Germany.
4112847  10/1992  Germany.

*Primary Examiner*—Bentsu Ro
*Attorney, Agent, or Firm*—Spencer & Frank

[57] ABSTRACT

The invention relates to an apparatus for operating a windshield wiper, having a sensor device for detecting the state of wetness of the windshield, an evaluating device that receives the sensor signal and in which an adjusting device is provided for updating a reference value, and an actuator unit for the windshield wiper that is actuated by the evaluating device for initiating a wiping process if the difference between the reference value and a current measured value exceeds a predetermined threshold value. The evaluation and analysis of an event that influences the sensor signal, such as a slow buildup on the windshield under drizzly or foggy conditions, are facilitated by the fact that the adjusting device includes at least one adjusting stage whose time constant is in an order of magnitude of one second to a few seconds, and that the reference value can be followed step-wise, taking into consideration all current measured values received at intervals of fractions of a second.

11 Claims, 1 Drawing Sheet

DEVICE FOR OPERATING A WINDSHIELD WIPER

This application was filed under the Patent Cooperation Treaty on Apr. 17, 1996, and assigned Ser. No. PCT/DE96/00673.

BACKGROUND OF THE INVENTION

The invention relates to an apparatus for operating a windshield wiper, having a sensor device for detecting the state of wetness of a windshield, an evaluating device that receives the sensor signal, and in which an adjusting device is provided for generating a reference value, and an actuator unit for the windshield wiper that is actuated by the evaluating device for initiating a wiping process if the difference between the reference value and a current measured value exceeds a predetermined threshold.

An apparatus of this type is known from DE 33 14 770 A1. In this known apparatus, a reference value is adjusted to the maximum sensor signal value following an initial wiping process, and, if the sensor signal is reduced due to soiling or cloudiness of the windshield that cannot be eliminated by the wiper, the reference value can be followed by the reduced signal amplitude in an order of magnitude of a few minutes. It has been seen, however, that this type of following does not adequately take into account influences that can be attributed to wetness or soiling of the windshield that can be eliminated by the wiper.

Similar difficulties affect the apparatus disclosed in DE 41 12 847 A1, whose objective is to adapt the steady-state level of a sensor signal to a long-time drift, a temperature drift and/or to structural conditions in the region of the sensor device.

SUMMARY OF THE INVENTION

It is the object of the invention to refine an apparatus of the type mentioned at the outset in such a way that events that should trigger a wiping process can be better recognized.

This object is accomplished by an apparatus of the type mentioned at the outset which is characterized in that the wiping process is initiated if a difference between the reference value and the current measured value exceeds a threshold value; in that the time constant of the adjusting stage is on the order of magnitude of one second to a few seconds for following the reference value during the wiping operation; and in that the reference value is followed step-wise with consideration of all current measured values received at intervals of fractions of a second.

Accordingly, it is provided that the adjusting device has at least one adjusting stage, whose time constant is on the order of magnitude of one second to a few seconds, and that the reference value can be followed step-wise, taking into consideration all of the current measured values received at intervals of fractions of a second. Consequently, the reference value, with respect to which the difference from the current measured value is determined for triggering the wiping operation if a predetermined threshold value is exceeded, is followed by the sensor signal, for example with a slow buildup on the windshield due to fine raindrops, such that the type of event that may trigger a wiping operation can be better detected and analyzed than in apparatuses of this type that have been used up to this point, and a wiping operation that is optimally matched to the event can be selected.

The wiping operation is adapted well to the external conditions because the one time constant can be selected to be between one second and six seconds, and the current measured values are received at intervals of a few milliseconds.

For reliable detection of the current measured values of the sensor device, and simple, selectable adjustment of the reference value, for example through corresponding programming, it is possible for the reference value to be updated by one increment in the direction of a reference source value generated in an upstream, first adjusting stage after the time corresponding to a time constant has expired, and for the first time constant of the first adjusting stage to amount to a fraction of the one time constant, and for the reference source value to be altered by one increment in the direction of the then-present, current measured value at temporal intervals corresponding to the first time constant.

A simple design of the apparatus provides that the first adjusting stage has a first comparator device for comparing the current measured value and the present reference source value, and that the one adjusting stage has a second comparator device for comparing the reference source value present after the expiration of the time corresponding to a time constant to the then-present reference value of the one adjusting stage. With these measures, a dual-stage design is achieved that offers a good possibility of suitably predetermining the time constants of the two adjusting stages. Details of the design include the fact that, for example, the upstream, first adjusting stage has a first intermediate register, and the one adjusting stage has a second intermediate register, in which the reference source value or reference value can be stored.

With the provision of a counting device with which the updating events for the reference source value are counted in the first adjusting stage within a predeterminable counting cycle, and because, after the completion of the counting cycle or the expiration of a predeterminable number of counting cycles, the reference value present in the first adjusting stage is supplied to the one adjusting stage to form the reference value, the time constant of the one (downstream) adjusting stage can be altered in a simple manner through the shortening or lengthening of the counting cycle.

An advantageous option of taking into account typical courses of the sensor signal for optimizing the wiping operation lies in the fact that the evaluating device can distinguish between positive and negative sensor signal courses, and with a positive course, the reference value can be updated with a smaller time constant, while with a negative course the value can be updated with a larger time constant. Adaptation to given conditions is further improved by the selection of the time constant to be shorter up to a few minutes following the start of the wiping operation, and then longer afterward, when the course of the sensor signal is negative.

In accordance with an advantageous measure for selecting the short time constant for a positive sensor signal course, the shorter time constant corresponds to the first time constant, and the reference source value is used, as a reference value, as the basis of the difference formation for possibly triggering the wiping operation.

One embodiment provides a further option of optimizing the wiping operation such that the difference threshold value for triggering a wiping operation corresponds to a predetermined fraction of the reference value if the reference value does not exceed a predetermined value, and that the threshold value is set at a fixed number of increments if the reference value does exceed the predetermined value.

BRIEF DESCRIPTION OF THE DRAWINGS

The invention is described in detail below by way of an embodiment, with reference to the drawings, in which.

DESCRIPTION OF THE PREFERRED EMBODIMENTS

Figure 1:
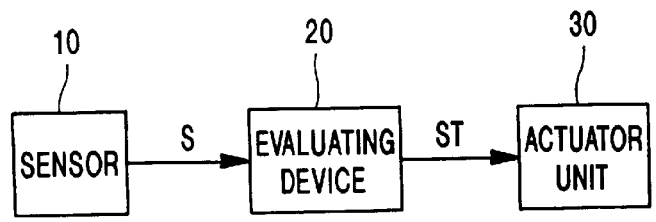
FIG. 1 is a schematic block diagram of an apparatus for operating a windshield wiper.

FIG. 1 shows a sensor device 10 that emits a sensor signal S to an evaluating device 20. The evaluating device 20 supplies a control signal ST to an actuator unit 30 in case an event occurs on a windshield, not shown, that influences the sensor signal S and necessitates the triggering of the wiping operation.

The sensor device 10 is, for example, an optical sensor, as described in accordance with the above-cited related art.

The sensor device 10 supplies an edited signal as sensor signal S, which signal forms the basis of the analysis by the evaluating device 20 of the nature of wetness or soiling of the windshield, and the basis of the suitable formation by the evaluating device of the control signal ST for initiating an optimum wiping operation by way of the actuator unit 30. In this instance, the wiping operation can comprise, for example, a direct triggering of a wiping operation that is triggered in a corresponding manner with the occurrence of any similar event. Furthermore, the wiping operation can comprise interval operation with variable interval times, or continuous operation in different stages.

Figure 2:
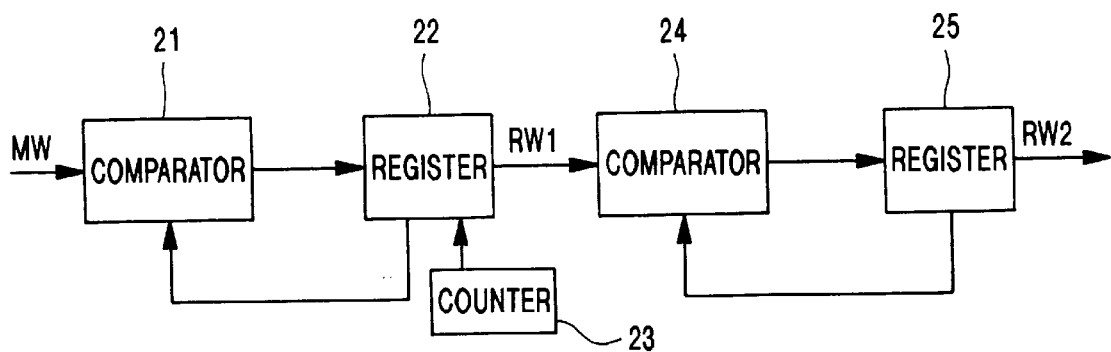
FIG. 2 shows a section of the evaluating device, also in a block representation.

FIG. 2 shows a detailed section of the evaluating device, with which a refined analysis of an event influencing the sensor signal S is possible, and with which a suitable wiping operation can be triggered by way of a corresponding control signal ST, if necessary. The circuit includes a first adjusting stage having a first comparator device 21, a first intermediate register 22 and a counting device 23. A further adjusting stage having a second comparator device 24 and a second intermediate register 25 is connected to the first adjusting stage.

The first comparator device 21 is supplied with a current measured value MW from the sensor signal S, on the one hand, and, on the other hand, a reference source value stored in the first intermediate register 22, at short temporal intervals in an order of magnitude of milliseconds, e.g. 5 ms. These temporal intervals result in a first time constant. The current measured value MW and the current reference source value RW1 are compared to one another in the first comparator device 21, and, if a difference exists, the reference source value RW1 is changed by one increment in the direction of the current measured value MW. The counting device 23 counts the comparison processes, and once a predetermined number of counting steps has been reached, the reference source value RW1 then present in the first intermediate register 22 is supplied to the downstream, second comparator device 24, and compared there to a further reference value RW2 present in the further intermediate register 25. If a difference exists between the reference source value RW1 and the reference value RW2, the reference value present in the second intermediate register 25 is changed by one increment in the direction of the reference source value RW1. The difference between the current measured value MW and the reference value RW2 is monitored in the evaluating circuit 20 and, if a threshold value is exceeded, a control signal ST is emitted for triggering a wiping operation. This may be the case with rain, for example, because the amplitude of the sensor signal S is consequently reduced.

The predeterminable counting cycle after which the first intermediate register 22 further transmits the reference source value RW1 is a multiple of the first time constant, for example 256 times the constant. With a first time constant of 5 ms, a time constant of 1.28 s results for the further adjusting stage. However, shorter or longer counting cycles can also be set, in which instance the first reference value RW1 is not transferred into the further adjusting stage after each cycle, but after every second, third or fourth cycle or more cycles, for example, in order to increase the time constant of the downstream, further adjusting stage. A further time constant of, for example, 5.12 s can be achieved with a transfer after four counting cycles.

It is practical to select two or more different time constants, such as a small one for positive courses of the sensor signal S (e.g. drying schlieren or streaks), and a large one for negative courses of the sensor signal S (e.g. buildup on the windshield due to drizzle). During the negative signal change, it is advantageous to select a shorter time constant, e.g. 1.28 s, for the first minute following the start, and afterward a longer time constant, e.g. 5.12 s, per increment. With a positive change in the sensor signal S, a small time constant of, for example, 5 ms per increment is suitable, so that the reference source value can be used as the reference value RW1 for difference formation with the current measured value MW at the output of the first adjusting stage.

The difference threshold value for triggering a wiping operation is advantageously not constant, but a function of the absolute level of the reference value, to achieve uniform sensitivity that is not a function of the absolute level in limits. The threshold value is, for example, $\frac{1}{16}$ of the reference value if the reference value is greater than 100 increments; otherwise, it is 6 increments.

So that the apparatus can react to very fine rain, for example fog, a second path is set up inside the evaluating device 20 that becomes active, for example, six seconds after the wiper has reached it parked position, and only reacts to small, lengthy signal breaks.

The average value of the first four measured values, for example, is the start value for forming the reference value according to FIG. 2.

Very small amounts of precipitation can also be identified with the described apparatus.

What we claim is:

1. An apparatus for operating a windshield wiper, comprising:

a sensor device (10) for detecting the state of wetness of a windshield and generating a sensor signal (S);

an evaluating device (20) that receives the sensor signal, evaluating device including a first adjusting stage (21, 22, 23) for receiving measured values (MW) of the sensor signal at intervals of a fraction of a second and generating a first reference value RW1), and a second adjusting stage (24, 25) for generating a second reference value (RW2) which follows the first reference value; and an actuator unit (30) for the windshield wiper that is actuated by the evaluating device (20) for initiating a wiping process if the difference between the second reference value (RW2) and a current measured value (MW) exceeds a threshold value, wherein the second reference value (RW2) generated by the second adjusting stage (24, 25) follows the first reference value (RW1) step-wise with consideration of recent measured values (MW) and wherein the second adjusting stage (24, 25) has a time constant on the order of magnitude of one second to a few seconds.

2. An apparatus according to claim 1, wherein the time constant of the second adjusting stage (24, 25 is selected to be between one second and six seconds, and wherein the measured values (MW) are received by the first adjusting stage (21, 22, 23) at intervals of a few milliseconds.

3. An apparatus according to claim 2, wherein the first adjusting stage (21, 22, 23) comprises a counting device (23) with which updating events for the first reference value (RW1) are counted within a predeterminable counting cycle, and wherein the first reference value (RW1) present in the first adjusting stage (21, 22, 23) after the completion of the counting cycle or after the expiration of a predeterminable number of counting cycles is supplied to the second adjusting stage (24, 25) for forming the second reference value (RW2).

4. An apparatus according to claim 2, wherein the evaluating device (20) can distinguish between positive and negative courses or waveform paths of the sensor signal (S), and wherein, with a positive source, the second reference value (RW2) is updated by the second adjusting stage (24, 25) using a time constant that is small, and with a negative course, the second reference valve (RW2) is updated by the second adjusting stage (24, 25) using a larger time constant.

5. An apparatus according to claim 4, wherein the time constant of the second adjusting stage (24, 25) is selected to be small up to a few minutes after the start of the wiping operation, and is selected to be larger afterward.

6. An apparatus according to claim 4, wherein the time constant of the second adjusting stage (24, 25) corresponds to the time constant of the first adjusting stage (21, 22, 23).

7. An apparatus according to claim 1, wherein the second reference value (RW2) is updated by the second adjustment stage (24, 25) by one increment in the direction of the first reference value (RW1) generated by the first adjusting stage (21, 22, 23) after the expiration of a time corresponding to the constant of the second adjusting stage (24, 25); wherein the first adjusting stage (21, 22, 23) has a time constant that is a fraction of the time constant of the second adjusting stage (24, 25); and wherein the first reference value (RW1) is changed by the first adjusting stage (21, 22, 23 by one increment in the direction of the then-present current measured value (MW) at time intervals corresponding to the time constant of the first adjusting stage (21, 22, 23).

8. An apparatus according to claim 7, wherein the first adjusting stage (21, 22) comprises a first comparator device (21) for comparing the current measured value (MW) and the present first reference value (RW1), and wherein the second adjusting stage (24, 25) comprises a second comparator device (24) for comparing the first reference value (RW1) present after the expiration of the time corresponding to the time constant of the second adjusting device (24, 25) and the then-present second reference value (RW2) of the second adjusting stage (24, 25).

9. An apparatus according to claim 7, wherein the first adjusting stage (21, 22, 23) comprises a first intermediate register (22), and wherein the second adjusting stage (24, 24) comprises a second intermediate register (25), in which the first reference value (RW1) or the second reference value (RW2) can be stored.

10. An apparatus according to claim 1, wherein the threshold value for initiating a wiping process corresponds to a predetermined fraction of the second reference value (RW2) if the second reference value (RW2) does not exceed a predetermined value, and wherein the threshold value is fixed if the second reference value (RW2) does exceed the predetermined value.

11. An apparatus according to claim 1, wherein the evaluating device (20) has a further path that can be activated after the wiper has been in its parked position for at least a few seconds, and with which a signal can be triggered if a small, lengthy break in the sensor signal (S) is determined.

* * * * *